(12) United States Patent
Yao et al.

(10) Patent No.: US 6,856,105 B2
(45) Date of Patent: Feb. 15, 2005

(54) MULTI-ENERGY PARTICLE ACCELERATOR

(75) Inventors: Chong Guo Yao, Pacheco, CA (US); Kenneth Whitham, Alamo, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 3 days.

(21) Appl. No.: 10/396,257

(22) Filed: Mar. 24, 2003

(65) Prior Publication Data

US 2004/0202272 A1 Oct. 14, 2004

(Under 37 CFR 1.47)

(51) Int. Cl.$^7$ .............................................. H05H 9/00
(52) U.S. Cl. ..................................... 315/505; 315/501
(58) Field of Search ................................. 315/505, 501, 315/502, 503, 500, 506

(56) References Cited

U.S. PATENT DOCUMENTS

| | | | | |
|---|---|---|---|---|
| 3,769,599 A | * | 10/1973 | Leboutet et al. | 315/507 |
| 4,868,843 A | | 9/1989 | Nunan | 378/152 |
| 6,465,957 B1 | * | 10/2002 | Whitham et al. | 315/5.41 |
| 6,465,958 B1 | * | 10/2002 | Wilcox et al. | 315/5.43 |
| 6,593,579 B2 | * | 7/2003 | Whithman | 250/423 F |
| 2004/0084634 A1 | * | 5/2004 | Bechthold et al. | 250/492.3 |

OTHER PUBLICATIONS

Varian Product brochure, 3pgs.
"Prebuncher", download from http://www.physics.purdue.edu/~carott/prebunch.html on Jan. 14, 2003; (Term Project PHYS 570Z, 1998 Carsten Rott); 8pgs.
S.M. Hanna, "Applications of X–Band Technology in Medical Accelerators", Proceedings of the 1999 Particle Accelerator Conference, New York, 1999, IEEE Pub. No. 0–7803–5573–3; pp. 2516–2518.

* cited by examiner

*Primary Examiner*—Tuyet Thi Vo (57) ABSTRACT

Some embodiments include operation of an accelerator waveguide to accelerate particles to a first energy within the waveguide, wherein a prebuncher coupled to the waveguide outputs particle bunches having a first phase, change of a phase at which particle bunches will be output from the prebuncher from the first phase to a second phase, and operation of the accelerator waveguide to accelerate particles to a second energy within the waveguide, wherein the prebuncher outputs particle bunches having the second phase. Further aspects provide change of a resonant frequency of the prebuncher from a first frequency to a second frequency. According to still further aspects, the prebuncher includes a prebuncher cavity and change of the resonant frequency comprises change of a shape of the prebuncher cavity.

29 Claims, 6 Drawing Sheets

MULTI-ENERGY PARTICLE ACCELERATOR

BACKGROUND

1. Field

The present invention relates generally to particle accelerators. More particularly, embodiments of the present invention relate to particle accelerators having multiple output energies.

2. Description of the Related Art

A particle accelerator produces charged particles having particular energies. In one common application, a particle accelerator produces a radiation beam used for medical radiation therapy. The beam may be directed toward a target area of a patient in order to destroy cells within the target area.

A conventional particle accelerator includes a particle source, an accelerator waveguide and a microwave power source. The particle source may comprise an electron gun that generates and transmits electrons to the waveguide. The waveguide also receives electromagnetic waves from the microwave power source, such as a magnetron or a klystron. The electrons are accelerated through the waveguide by oscillations of the electromagnetic waves within cavities of the waveguide.

The electromagnetic waves and the waveguide cavities are designed to optimally accelerate electrons having a particular phase. Since the electrons emitted by the electron gun may differ in phase, a prebuncher may be used to "bunch" groups of the emitted electrons at or approximately at that particular phase. The prebuncher may consist of a cavity that receives electrons from the electron gun before the electrons are received by the accelerator waveguide. The prebuncher also receives a wave from the microwave power source. Due to variations in the phases of the received electrons, electric fields created by the wave within the prebuncher cavity will accelerate some of the electrons and deaccelerate others.

The electrons exit the prebuncher cavity and pass through a drift space. The drift space does not include a substantial accelerating electric field. The electrons therefore travel through the drift space based on their respective initial velocities upon exiting the prebuncher cavity. During their travel through the drift space, the electrons that were accelerated by the prebuncher cavity overtake electrons that were deaccelerated, thereby creating bunches of electrons. The phase of each electron in a bunch is close to the phase of other electrons in the bunch.

The electron bunches are initially received by a first portion of the accelerator waveguide. This first portion is known as a buncher. The buncher prepares the electron bunches for subsequent acceleration by an accelerating portion of the waveguide. In particular, the buncher may include tapered cavity lengths and apertures so that the phase velocity and field strength of the received electromagnetic wave begin low at the input of the buncher and increase to values that are characteristic to the accelerating portion. Typically, the characteristic phase velocity is equal to the velocity of light. As a result, the electron bunches gain energy and are further bunched toward a common phase as they travel through the buncher.

The accelerating portion of the waveguide includes cavities that are designed to ensure synchrony between the electron bunches and the oscillating electromagnetic wave received from the microwave power source. More particularly, the cavities are designed so that electric currents flowing on their surfaces generate electric fields that are suitable to accelerate the electron bunches. The oscillation of these electric fields within each cavity is delayed with respect to an upstream cavity so that an electron bunch is further accelerated as it arrives at each cavity.

A particle accelerator is usually designed to operate within a small window of output particle energies. Due to the number of factors that interact during operation, a conventional particle accelerator cannot efficiently provide particle energies outside of the small window. As described above, these interacting factors include, but are not limited to: an electron current; frequency and energy of the electromagnetic wave; shape, construction and resonant frequency of the prebuncher and waveguide cavities; and desired output energy.

Some current particle accelerators attempt to efficiently output particles having widely-varying energies. One current system uses a shunt to "short out" a portion of the accelerator waveguide and to therefore reduce particle acceleration based on a desired output energy. Another accelerator includes two separate waveguide sections for accelerating electrons based on a desired output energy. Neither of these current accelerator structures is seen to provide efficient operation at substantially different output energies.

SUMMARY

In order to address the foregoing, some embodiments provide a system, method, apparatus, and means to operate a prebuncher to output first particle bunches having a first phase to an accelerator waveguide, to operate the accelerator waveguide to accelerate the first particle bunches to a first energy, to operate the prebuncher to output second particle bunches having a second phase to the accelerator waveguide, and to operate the accelerator waveguide to accelerate the second particle bunches to a second energy. In some aspects, operation of the prebuncher to output the second particle bunches includes change of a resonant frequency of the prebuncher from a first frequency to a second frequency. In further aspects, the prebuncher includes a prebuncher cavity, and change of the resonant frequency includes change of a shape of the prebuncher cavity.

Some embodiments provide operation of an accelerator waveguide to accelerate particles to a first energy within the waveguide, wherein a prebuncher coupled to the waveguide outputs particle bunches having a first phase, change of a phase at which particle bunches will be output from the prebuncher from the first phase to a second phase, and operation of the accelerator waveguide to accelerate particles to a second energy within the waveguide, wherein the prebuncher outputs particle bunches having the second phase. Further aspects provide change of a resonant frequency of the prebuncher from a first frequency to a second frequency. According to still further aspects, the prebuncher includes a prebuncher cavity and change of the resonant frequency comprises change of a shape of the prebuncher cavity.

Embodiments also relate to systems including a prebuncher to output first particle bunches having a first phase in a first mode and to output second particle bunches having a second phase in a second mode, and an accelerator waveguide to accelerate the first particle bunches to a first energy in the first mode and to accelerate the second particle bunches to a second energy in the second mode.

The claimed invention is not limited to the disclosed embodiments, however, as those of ordinary skill in the art can readily adapt the teachings herein to create other embodiments and applications.

BRIEF DESCRIPTION OF THE DRAWINGS

Embodiments of the claimed invention will become readily apparent from consideration of the following specification as illustrated in the accompanying drawings, in which like reference numerals designate like parts, and wherein:

DETAILED DESCRIPTION

The following description is provided to enable any person of ordinary skill in the art to make and use embodiments of the claimed invention and sets forth the best modes contemplated by the inventors for carrying out the claimed invention. Various modifications, however, will remain readily apparent to those in the art.

Figure 1:
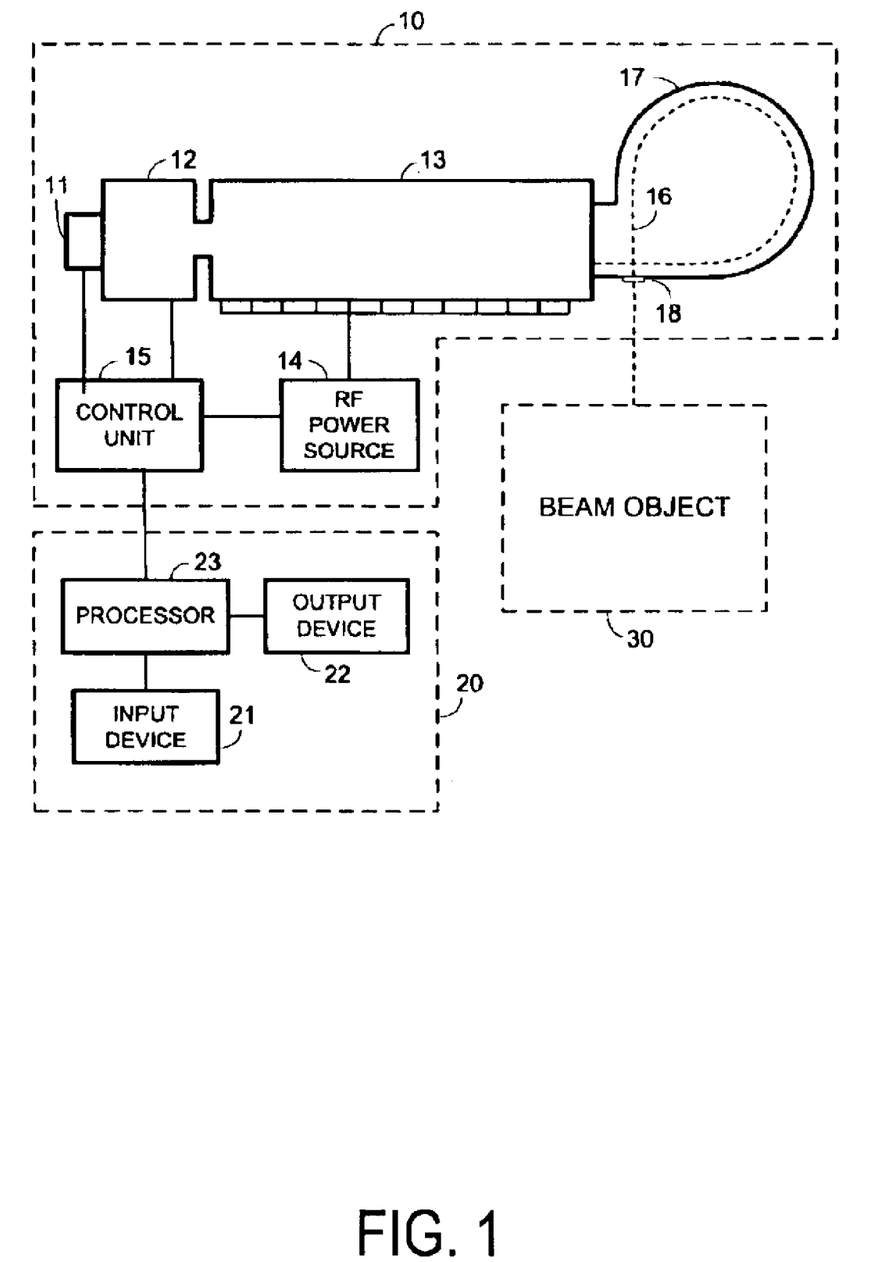
FIG. 1 is block diagram depicting a particle accelerator system according to some embodiments.

FIG. 1 illustrates an implementation according to some embodiments which includes particle accelerator 10, operator console 20 and beam object 30.

Particle accelerator 10 may be used to output particle bunches toward beam object 30 in response to commands received from operator console 20. According to some embodiments, the output particle bunches have a first energy when particle accelerator 10 is operated in a first mode and have a second energy when particle accelerator 10 is operated in a second mode.

Particle accelerator 10 includes particle gun 11 for injecting particles such as electrons into prebuncher 12. Particle gun 11 may comprise a heater, a thermionic cathode, a control grid, a focus electrode and an anode. Prebuncher 12 includes a prebuncher cavity and a drift space, and is used to bunch the injected electrons. Prebuncher 12 may also include one or more elements to change a phase of electron bunches which are output therefrom. These one or more elements and uses thereof will be described in more detail below.

Electron bunches emitted from prebuncher 12 are received by accelerator waveguide 13. Accelerator waveguide 13 may include a first section of cavities to operate as a buncher as described above and a second set of accelerating cavities. RF power source 14 is a magnetron or Klystron coupled to the cavities of accelerator waveguide 13 and of prebuncher 12 in order to provide an electromagnetic wave thereto. Control unit 15 controls a frequency and power of the electromagnetic wave based on operator instructions and/or feedback from elements of particle accelerator and/or another system. Control unit 15 also controls an injection voltage and beam current of particle gun 11.

Accelerating waveguide 13 outputs beam 16 to bending magnet 17. Beam 16 includes a stream of electron bunches having a particular energy and bending magnet 17 comprises an evacuated envelope to bend beam 16 270 degrees before beam 16 exits bending magnet 17 through window 18. Beam 16 is received by beam object 30, which may comprise a patient, a target for generating bremsstrahlung photon radiation, or another object.

Operator console 20 includes input device 21 for receiving instructions from an operator and processor 22 for responding to the instructions. Operator console 20 communicates with the operator via output device 22, which may be a monitor for presenting operational parameters and/or a control interface of particle accelerator 10. Output device 22 may also present images of beam object 30 to confirm proper delivery of beam 16 thereto.

In one example of operation according to some embodiments, an operator issues a command to output a 14 MeV beam using input device 21. Processor 22 transmits the command to control unit 15, which in turn sets a grid voltage of particle gun 11 to generate a beam current corresponding to the desired output energy. Control unit 15 also sets a power of the wave emitted by RF power source 14 based on the desired energy. As a result, particle accelerator 10 is operated to accelerate electron bunches to the desired energy.

After the beam has been output, the operator may issue a command to output a 7 MeV beam. Processor 22 again transmits the command to control unit 15. In order to operate accelerator 10 to accelerate electron bunches to the desired energy, control unit 15 changes the beam current and/or the RF wave power. Moreover, control unit 15 controls prebuncher 12 to change a phase of electron bunches exiting therefrom.

Such control of prebuncher 12 may comprise changing a resonant frequency of prebuncher 12. The resonant frequency may be changed by changing a shape of the prebuncher cavity. Moreover, the shape of the cavity may be changed by inserting an object into the prebuncher cavity, removing an object from the prebuncher cavity, deforming an internal surface of the cavity, and/or deforming an object located within the prebuncher cavity.

Figure 2:
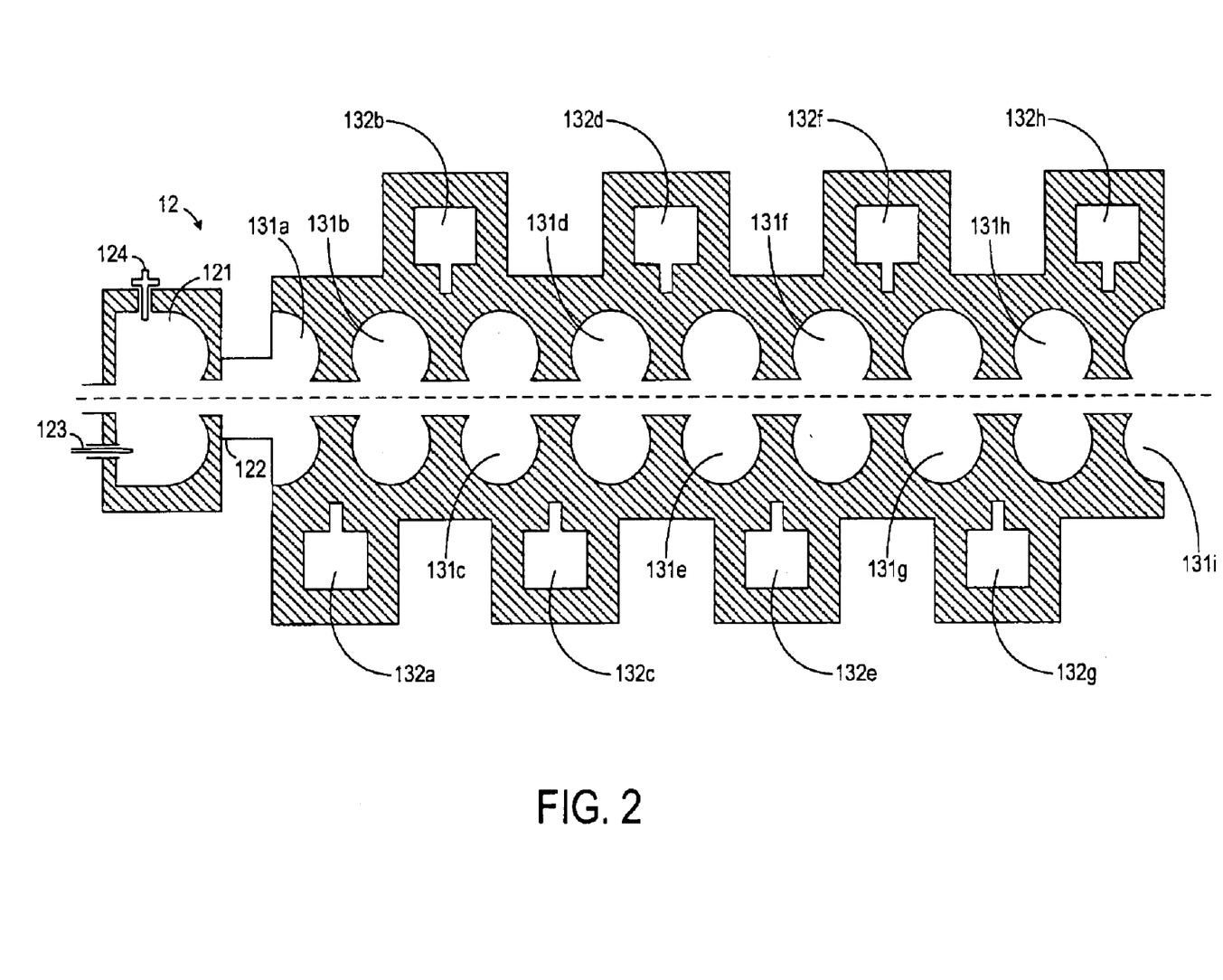
FIG. 2 is a cross-section of a linear accelerator according to some embodiments.

FIG. 2 is a cross-sectional view of elements of particle accelerator 10 according to some embodiments. Particularly, FIG. 2 illustrates prebuncher 12 and accelerator waveguide 13 of FIG. 1.

Prebuncher 12 is shown having single cavity 121 and drift tube 122. Single cavity 121 operates to transfer energy from an RF wave to electrons received from particle gun 11 (not shown). The electrons are bunched as they travel within a drift space defined by drift tube 122. Prebuncher 12 also includes coupling loop 123 for receiving the RF wave from RF power source 14. Coupling loop 123 may comprise a loop of coaxial conducting wire.

According to some embodiments, prebuncher 12 includes more than one cavity. Each of such cavities may be associated with a respective coupling loop 123 for receiving the RF wave. Multiple cavities may provide smaller bunch phase spread and more precise energy control than a single cavity.

Prebuncher 12 also includes tuner 124 for changing a phase of particle bunches that are output from prebuncher 12. In this regard, a phase of the particle bunches output from prebuncher 12 depends upon a resonant frequency of prebuncher cavity 121. The resonant frequency, and therefore the phase of the particle bunches, may be changed by moving tuner 124 so as to change a shape of cavity 121.

Accelerator waveguide 13 is coupled to prebuncher 12 and has a plurality of primary cavities 131a–i disposed along a central axis. Primary cavities 131 are arranged and formed to accelerate particles along waveguide 13. Although not shown in FIG. 2, each of primary cavities 131 is coupled to RF power source 14 to receive an RF wave for accelerating the particles.

A plurality of side cavities 132a–h are also provided. Each side cavity is disposed between pairs of primary cavities to provide side coupling between primary cavities. For example, side cavity 132b provides coupling between primary cavities 131b and 131c. The design and arrangement of these cavities is known to those in the art.

A first few primary cavities of accelerator waveguide 13 may operate as a buncher to increase a phase velocity of the particle bunches to that of the RF wave. Once the velocities are synchronized, the particle bunches will pass through each successive cavity during a time interval when the electric field intensity in the cavity is a maximum. Each of cavities 131a–i may be constructed such that its resonant frequency ensures that the particle bunches pass through each cavity during this time interval.

Figure 3:
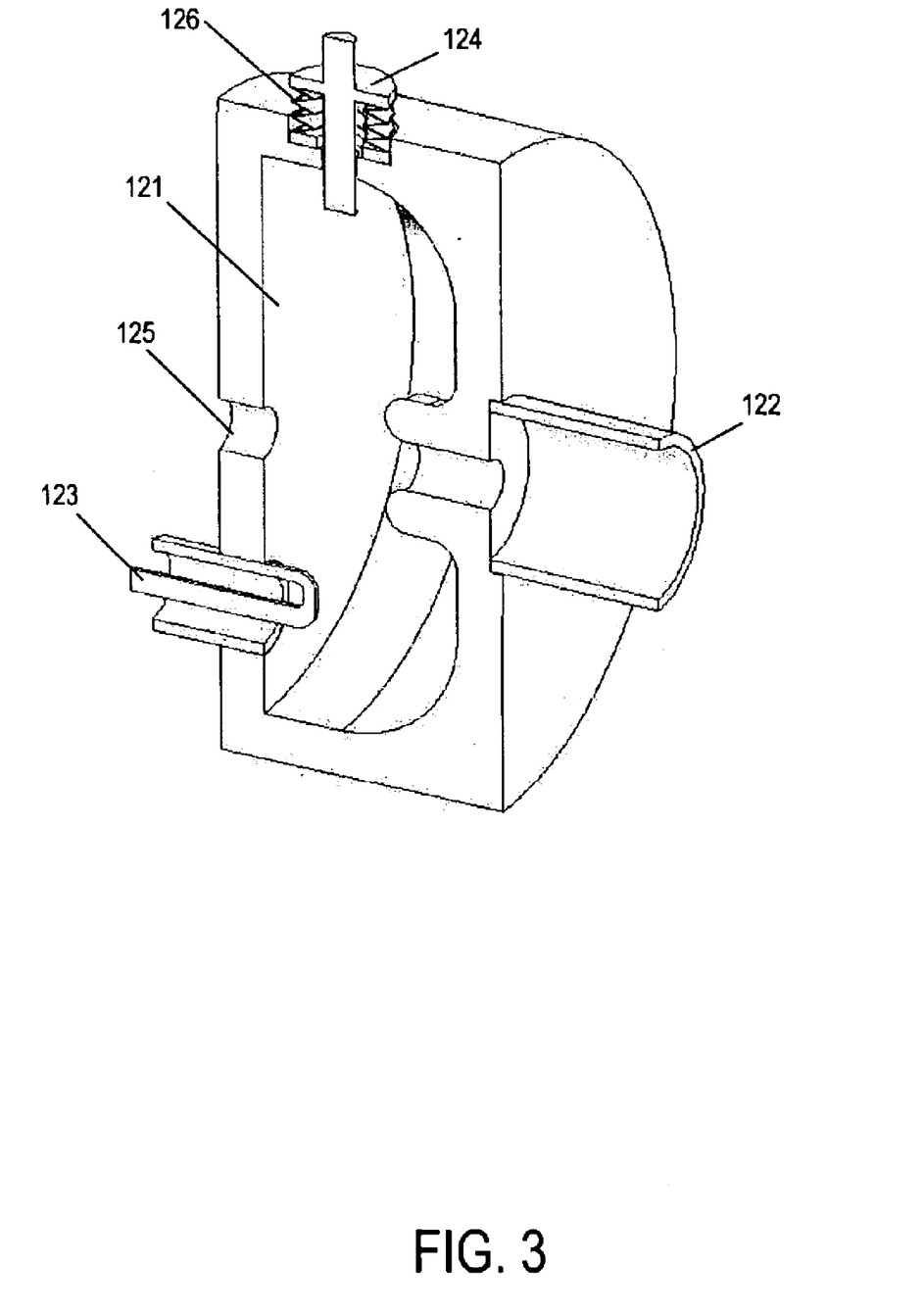
FIG. 3 is a cross-section of a prebuncher according to some embodiments.

FIG. 3 shows a detailed cross-section of prebuncher 12 according to some embodiments. Electrons from particle gun 11 initially enter prebuncher 12 at injection port 125. These electrons differ widely in phase but have fairly consistent energies. An RF wave received from coupling loop 123 generates electric fields within prebuncher cavity 121 that accelerate some of the particles and deaccelerate others based on the particles' phases. Upon leaving RF cavity 121, both the phases and energies of the particles differ widely.

The particles travel through drift tube 122 at different speeds based on their initial phase. Consequently, the particles are bunched together at a reference phase by the time they exit drift tube 122. Prebuncher 12 therefore emits a beam of particles that may differ in energy but are concentrated around a single reference phase. Any differences in energy will become insignificant since accelerator waveguide 13 will quickly accelerate the beam of particles to relativistic energies.

The reference phase is partially determined by a resonant frequency of prebuncher cavity 121. Tuner 124 operates to change the resonant frequency of prebuncher cavity and to thereby change a phase of particle bunches output by prebuncher 12. Tuner 124 may comprise any combination of materials and may be movable so as to change a volume or mass of tuner 124 that is located in prebuncher cavity 121. In this regard, bellows 126 may be operated to move tuner 124 in response to an indication from control unit 15. Other unshown elements may be used to provide such movement.

Figure 4:
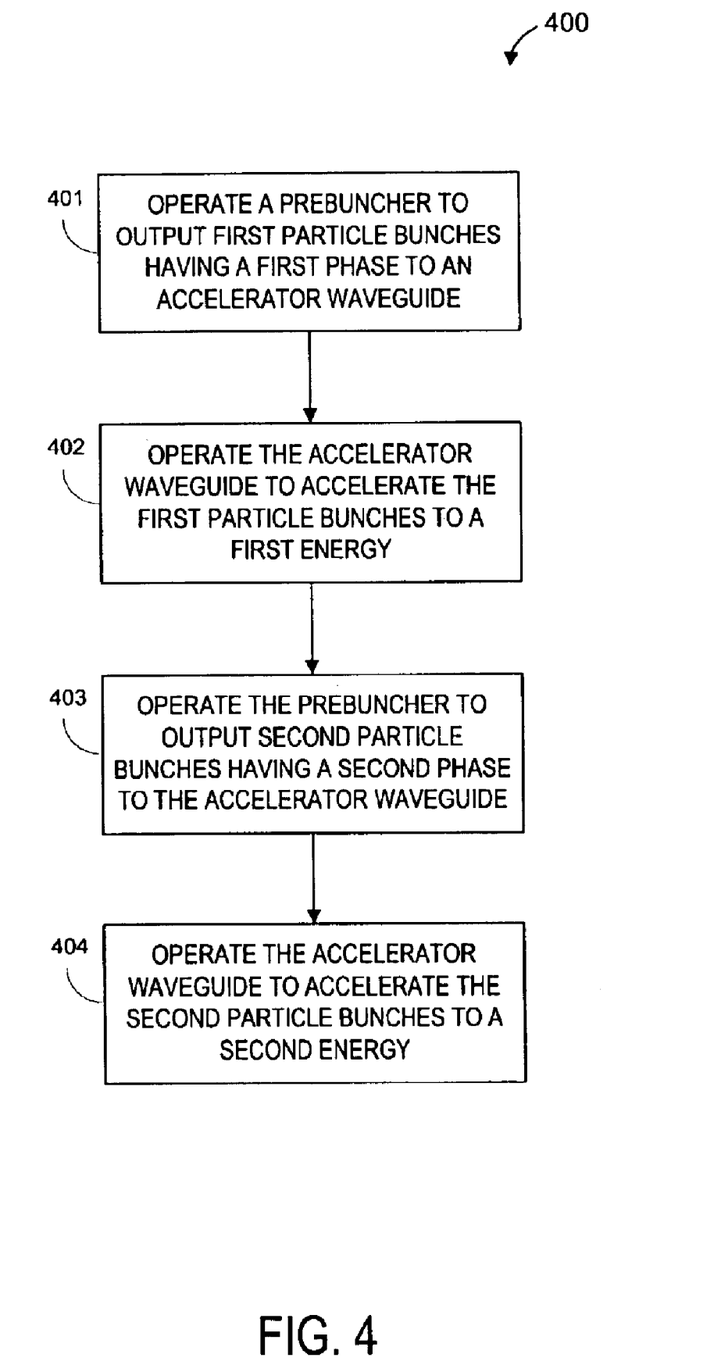
FIG. 4 is a flow diagram of process steps pursuant to some embodiments.

FIG. 4 is a flow diagram of process steps 400 according to some embodiments. Process steps 400 may be executed by one or more of particle accelerator 10, operator console 20, and other devices. Accordingly, process steps 400 may be embodied in hardware and/or software. Process steps 400 will be described below with respect to the above-described elements, however it will be understood that process steps 400 may be implemented and executed differently than as described below.

Prior to step 401, particle accelerator 10 may receive a command from console 20 to output a beam having a first energy. In response, an anode-to-cathode voltage and a grid voltage corresponding to the first energy are applied to particle gun 11. The anode-to-cathode voltage generates a beam of electrons, while the grid voltage provides fine control over the beam current. The electrons are received by injection port 125 of prebuncher 12. An RF wave is received from RF power source 14 by prebuncher 12 via coupling loop 123. A power of the wave is also set based on the first energy.

In step 401, prebuncher 12 is operated to output first particle bunches having a first phase to accelerator waveguide 13. The operation of step 401 may comprise ensuring that tuner 124 is disposed at a position shown in FIG. 3. This position may correspond to a primary mode of operation, and tuner 124 may be held at this position when no control is exerted over bellows 126. Step 401 may also comprise ensuring a desired coupling factor between coupling loop 123 and prebuncher cavity 121.

Prebuncher 12 thereby outputs first particle bunches having a first phase. As described above, the first phase depends on a resonant frequency of prebuncher cavity 121 and on a frequency of the RF wave.

Next, in step 402, accelerator waveguide 13 is operated to accelerate the first particle bunches to the first energy. The first energy is determined based on, among other factors, a beam current and a power of an RF wave delivered to the cavities of accelerator waveguide 13. The accelerated bunches may be delivered to beam object 30 according to a pre-defined plan, such as a radiation therapy plan.

After step 402, an operator may issue an instruction to switch between a first mode of operation of particle accelerator 10 at the first energy and a second mode of operation of particle accelerator 10 at a second energy. Particle accelerator 10 may be designed to operate at two or more energies, and the second energy may be equal to one of these energies.

In response to the instruction, prebuncher 12 is operated in step 403 in order to output particle bunches having a second phase. In this regard, a difference between the first phase and the second phase is substantially equal to arctan $[2Q_L(df/f)]$. $Q_L$ is equal to the loaded "quality factor" of prebuncher cavity 121, df is a difference between the resonant frequency of cavity 121 in step 401 and the resonant frequency in step 403, and f is equal to a frequency of the wave received from RF power source 14. Therefore, control unit 15 operates prebuncher 12 in step 403 to change a resonant frequency of prebuncher cavity 121.

Figure 5:
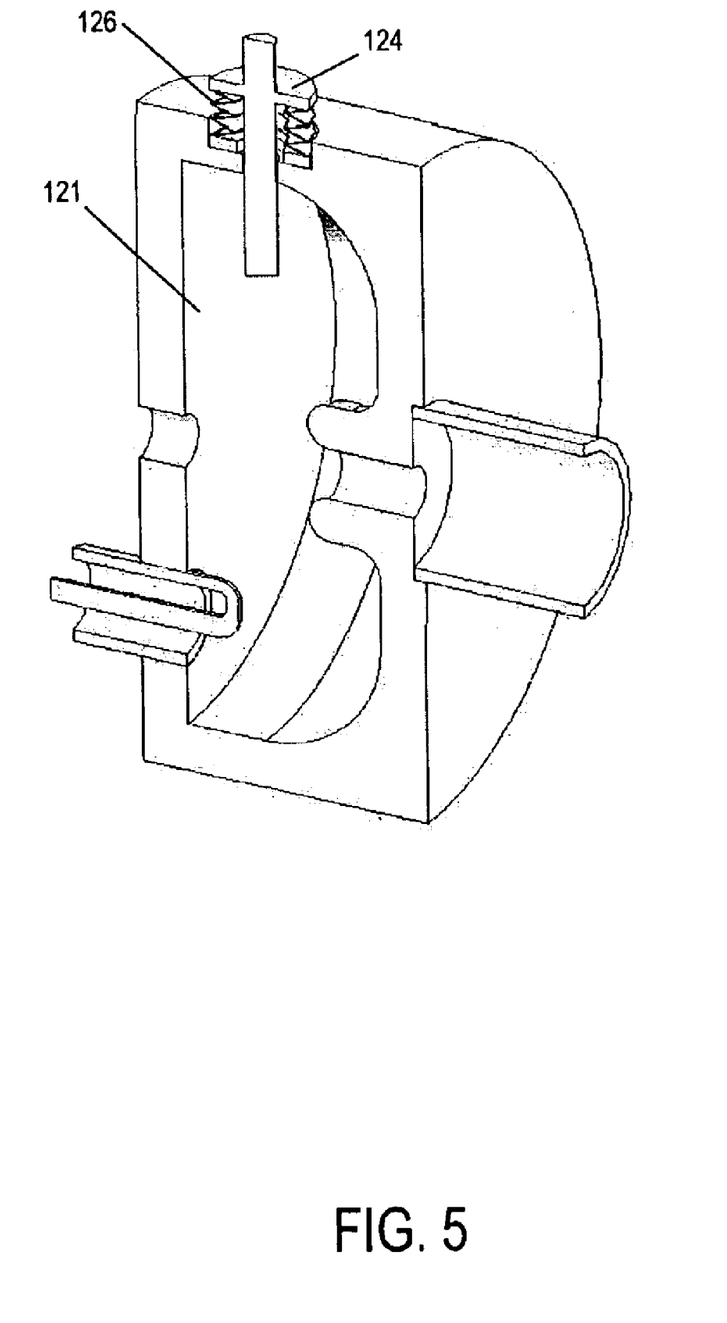
FIG. 5 is a cross-section of a prebuncher according to some embodiments.

The resonant frequency may be changed by operating bellows 126 to move tuner 124 into or out of cavity 121. One example of this movement is shown in FIG. 5, wherein tuner 124 has been moved into cavity 121. This movement changes a shape of the prebuncher cavity, and thereby changes the resonant frequency thereof. Other elements and techniques for changing the resonant frequency of prebuncher cavity 121 may be used in step 403, including but not limited to deforming an internal surface of cavity 121, and deforming an object located within cavity 121. Step 403 may be performed automatically in response to the instruction received from the operator.

Accelerator waveguide 13 is operated in step 404 to accelerate second particle bunches to the second energy. In some embodiments, control unit 15 changes one or both of the beam current and the RF wave power in step 404 based on the second energy. In some embodiments, flow may return to step 403 in order to output particle bunches having a third phase, and on to step 404 to accelerate the particle bunches to a third energy.

Figure 6:
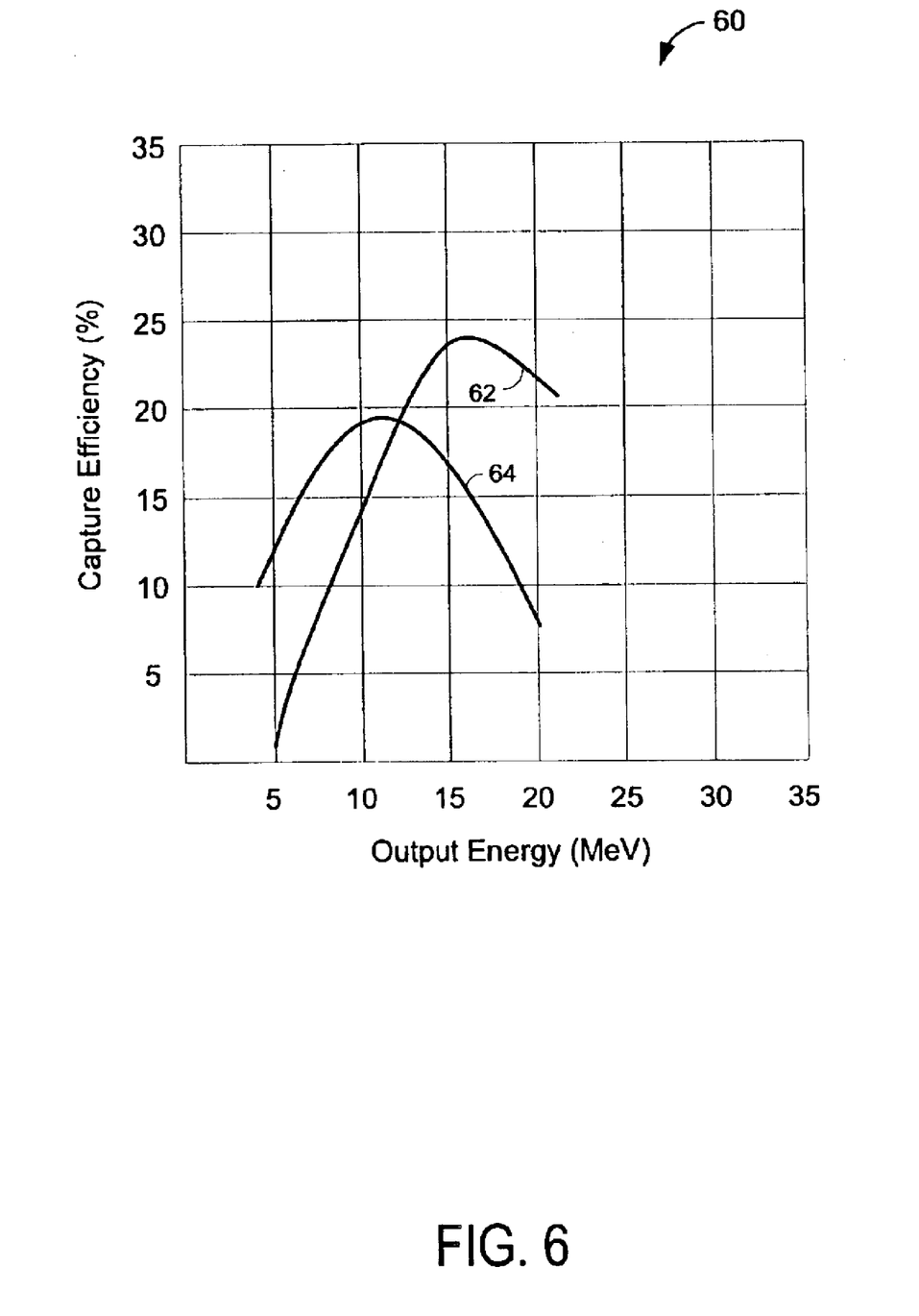
FIG. 6 is a graph illustrating improved operating performance according to some embodiments.

FIG. 6 illustrates an improved operating performance according to some embodiments of steps 400. Curve 62 shows an electron capture efficiency of particle accelerator 10 in step 402 with prebuncher 12 configured as shown in FIG. 3. As shown, the capture efficiency of particle accelerator 10 is approximately 23% when operated at an output energy of 14 MeV. Curve 62 also shows that the capture efficiency of particle accelerator 10 would be approximately 6% when operated at an output energy of 7 MeV while prebuncher 12 configured as shown in FIG. 3.

Curve 64 shows an electron capture efficiency of particle accelerator 10 in step 404 with prebuncher 12 configured as shown in FIG. 5. In this configuration, the capture efficiency of particle accelerator 10 is 15% when operated at an output energy of 7 MeV. Therefore, changing a phase of particle bunches output by prebuncher 12 may improve performance of particle accelerator 12 for certain output energies. This phenomenon may enable efficient production of particle bunches having multiple output energies from a single particle accelerator.

Those in the art will appreciate that various adaptations and modifications of the above-described embodiments can be configured without departing from the scope and spirit of the claimed invention. For example, embodiments may differ from process steps 400. Therefore, it is to be understood that, within the scope of the appended claims, the claimed invention may be practiced other than as specifically described herein.

What is claimed is:

1. A method comprising:
   operating a prebuncher to output first particle bunches having a first phase to an accelerator waveguide;
   operating the accelerator waveguide to accelerate the first particle bunches to a first energy;
   operating the prebuncher to output second particle bunches having a second phase to the accelerator waveguide; and
   operating the accelerator waveguide to accelerate the second particle bunches to a second energy.

2. The method according to claim 1, wherein operating the accelerator waveguide to accelerate the first particle bunches to the first energy comprises:
   operating an RF power source to deliver a wave having a first power to the accelerator waveguide, and
   wherein operating the accelerator waveguide to accelerate the second particle bunches to the second energy comprises:
   operating the RF power source to deliver a wave having a second power to the accelerator waveguide.

3. The method according to claim 1, wherein operating the accelerator waveguide to accelerate the first particle bunches to the first energy comprises:
   operating a particle gun to inject particles at a first current into the accelerator waveguide, and
   wherein operating the accelerator waveguide to accelerate the second particle bunches to the second energy comprises:
   operating the particle gun to inject particles at a second current into the accelerator waveguide.

4. The method according to claim 1, further comprising:
   receiving an instruction to switch between operation of the accelerator waveguide at the first energy and operation of the accelerator waveguide at the second energy; and
   automatically changing a resonant frequency of the prebuncher in response to the instruction.

5. The method according to claim 1, further comprising:
   operating the prebuncher to output third particle bunches having a third phase to the accelerator waveguide; and
   operating the accelerator waveguide to accelerate the third particle bunches to a third energy.

6. The method according to claim 1, wherein operating the prebuncher to output the second particle bunches comprises:
   changing a resonant frequency of the prebuncher from a first frequency to a second frequency.

7. The method according to claim 6, the prebuncher comprising a prebuncher cavity, wherein changing the resonant frequency comprises:
   changing a shape of the prebuncher cavity.

8. The method according to claim 7, wherein changing the shape of the prebuncher cavity comprises:
   inserting an object into the prebuncher cavity.

9. The method according to claim 7, wherein changing the shape of the prebuncher cavity comprises:
   deforming an internal surface of the prebuncher cavity.

10. The method according to claim 7, wherein changing the shape of the prebuncher cavity comprises:
    deforming an object located within the prebuncher cavity.

11. The method according to claim 7, further comprising:
    determining the second frequency based on the second energy, and
    wherein changing the shape of the prebuncher cavity comprises changing the shape of the prebuncher cavity based on the second energy.

12. The method according to claim 7, the prebuncher comprising a second prebuncher cavity, and wherein changing the resonant frequency further comprises:
    changing a shape of the second prebuncher cavity.

13. A method comprising:
    operating an accelerator waveguide to accelerate particles to a first energy within the waveguide, wherein a prebuncher coupled to the waveguide outputs particle bunches having a first phase;
    changing a phase at which particle bunches will be output from the prebuncher from the first phase to a second phase; and
    operating the accelerator waveguide to accelerate particles to a second energy within the waveguide, wherein the prebuncher outputs particle bunches having the second phase.

14. The method according to claim 13, wherein operating the accelerator waveguide to accelerate particles to the first energy comprises:
    operating an RF power source to deliver a wave having a first power to the accelerator waveguide, and
    wherein operating the accelerator waveguide to accelerate particles to the second energy comprises:
    operating the RF power source to deliver a wave having a second power to the accelerator waveguide.

15. The method according to claim 13, wherein operating the accelerator waveguide to accelerate particles to the first energy comprises:
    operating a particle gun to inject particles at a first current into the accelerator waveguide, and
    wherein operating the accelerator waveguide to accelerate particles to the second energy comprises:
    operating the particle gun to inject particles at a second current into the accelerator waveguide.

16. The method according to claim 13, further comprising:
    receiving an instruction to switch between operation of the accelerator waveguide at the first energy and operation of the accelerator waveguide at the second energy; and automatically changing the resonant frequency of the prebuncher in response to the instruction.

17. The method according to claim 13, further comprising:
changing a phase at which particle bunches will be output from the prebuncher to a third phase; and
operating the accelerator waveguide to accelerate particles to a third energy within the waveguide, wherein the prebuncher outputs particle bunches having the third phase.

18. The method according to claim 13, wherein changing the phase comprises:
changing a resonant frequency of the prebuncher from a first frequency to a second frequency.

19. The method according to claim 18, the prebuncher comprising a prebuncher cavity, wherein changing the resonant frequency comprises:
changing a shape of the prebuncher cavity.

20. A method according to claim 19, further comprising:
determining the second frequency based on the second energy, and
wherein changing the shape of the prebuncher cavity comprises changing the shape of the prebuncher cavity based on the second energy.

21. The method according to claim 19, the prebuncher comprising a second prebuncher cavity, and wherein changing the resonant frequency further comprises:
changing a shape of the second prebuncher cavity.

22. A system comprising:
a prebuncher to output first particle bunches having a first phase in a first mode and to output second particle bunches having a second phase in a second mode; and
an accelerator waveguide to accelerate the first particle bunches to a first energy in the first mode and to accelerate the second particle bunches to a second energy in the second mode.

23. The system according to claim 22, further comprising:
an RF power source to transmit to the accelerator waveguide a first wave having a first power, the first wave to accelerate the first particle bunches to the first energy, and to transmit to the accelerator waveguide a second wave having a second power, the second wave to accelerate the second particle bunches to the second energy.

24. The system according to claim 22, further comprising:
a particle gun to inject particles of the first particle bunches at a first current into the accelerator waveguide in the first mode, and to inject particles of the second particle bunches at a second current into the accelerator waveguide in the second mode.

25. The system according to claim 22,
the prebuncher to output third particle bunches having a third phase in a third mode, and
the accelerator waveguide to accelerate the third particle bunches to a third energy in the third mode.

26. A system according to claim 22, the prebuncher further comprising:
an element to change a resonant frequency of the prebuncher from a first frequency in the first mode to a second frequency in the second mode.

27. The system according to claim 26, wherein the element is adapted to change a shape of a cavity within the prebuncher.

28. The system according to claim 26, further comprising:
a receiver to receive an instruction to switch between the first mode and the second mode,
wherein the element is adapted to automatically change the resonant frequency of the prebuncher in response to the instruction.

29. The system according to claim 26, wherein a difference between the first phase and the second phase is substantially equal to $\arctan[2Q_L(df/f)]$, wherein $Q_L$ is equal to the loaded Q of a cavity within the prebuncher, df is equal to a difference between the first frequency and the second frequency, and f is equal to a frequency of a wave used to accelerate the first particle bunches and the second particle bunches.

* * * * *